May 29, 1962 R. M. MAGNUSON ET AL 3,036,419
BEAN HARVESTER
Original Filed June 24, 1957 4 Sheets-Sheet 1
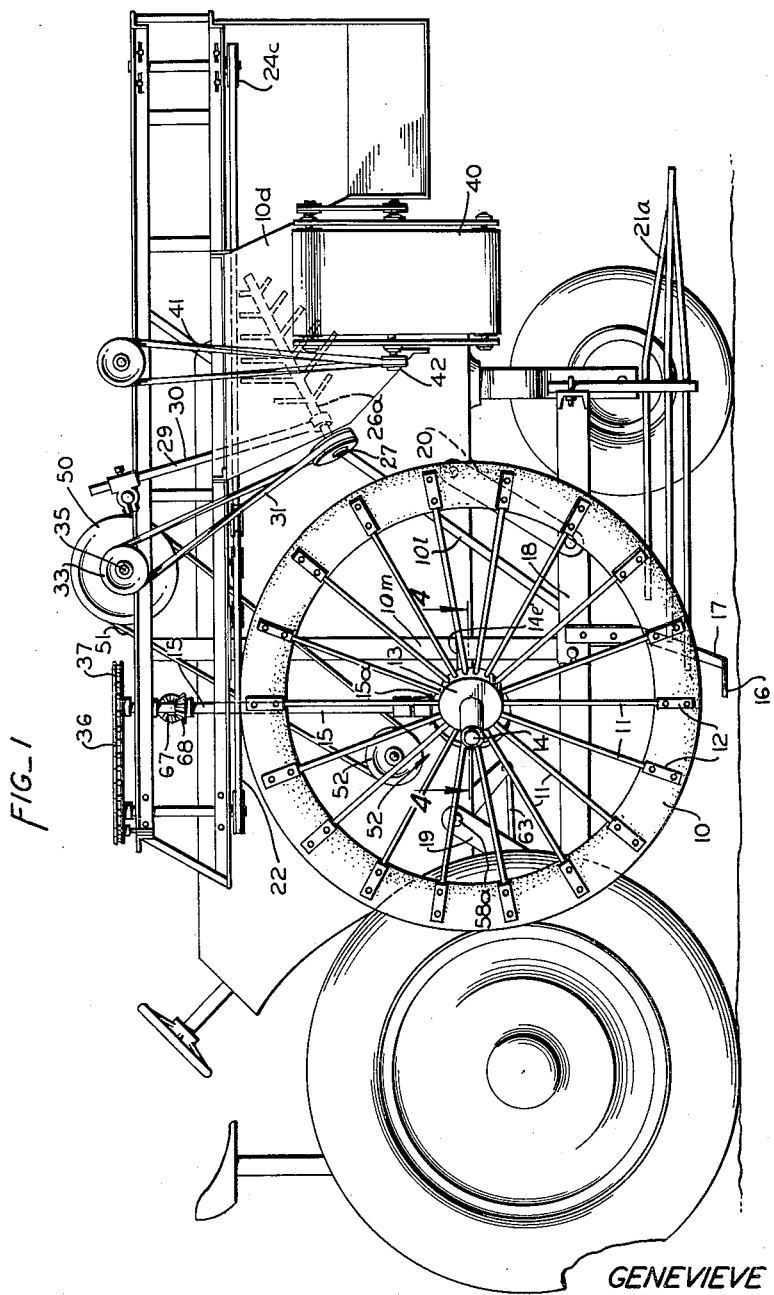
INVENTORS
GENEVIEVE I. MAGNUSON
EXECUTRIX OF THE ESTATE OF
ROY M. MAGNUSON, DECEASED
RALPH K. DAUGHERTY
BY
their ATTORNEYS

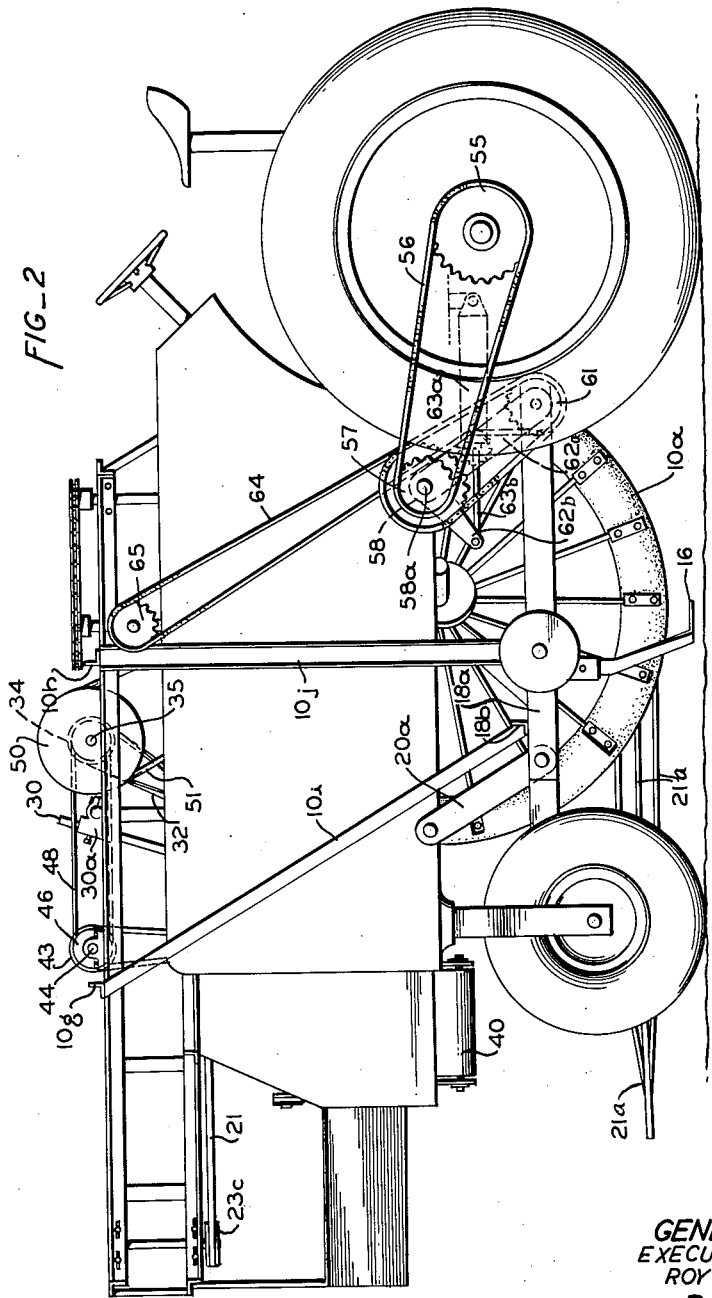

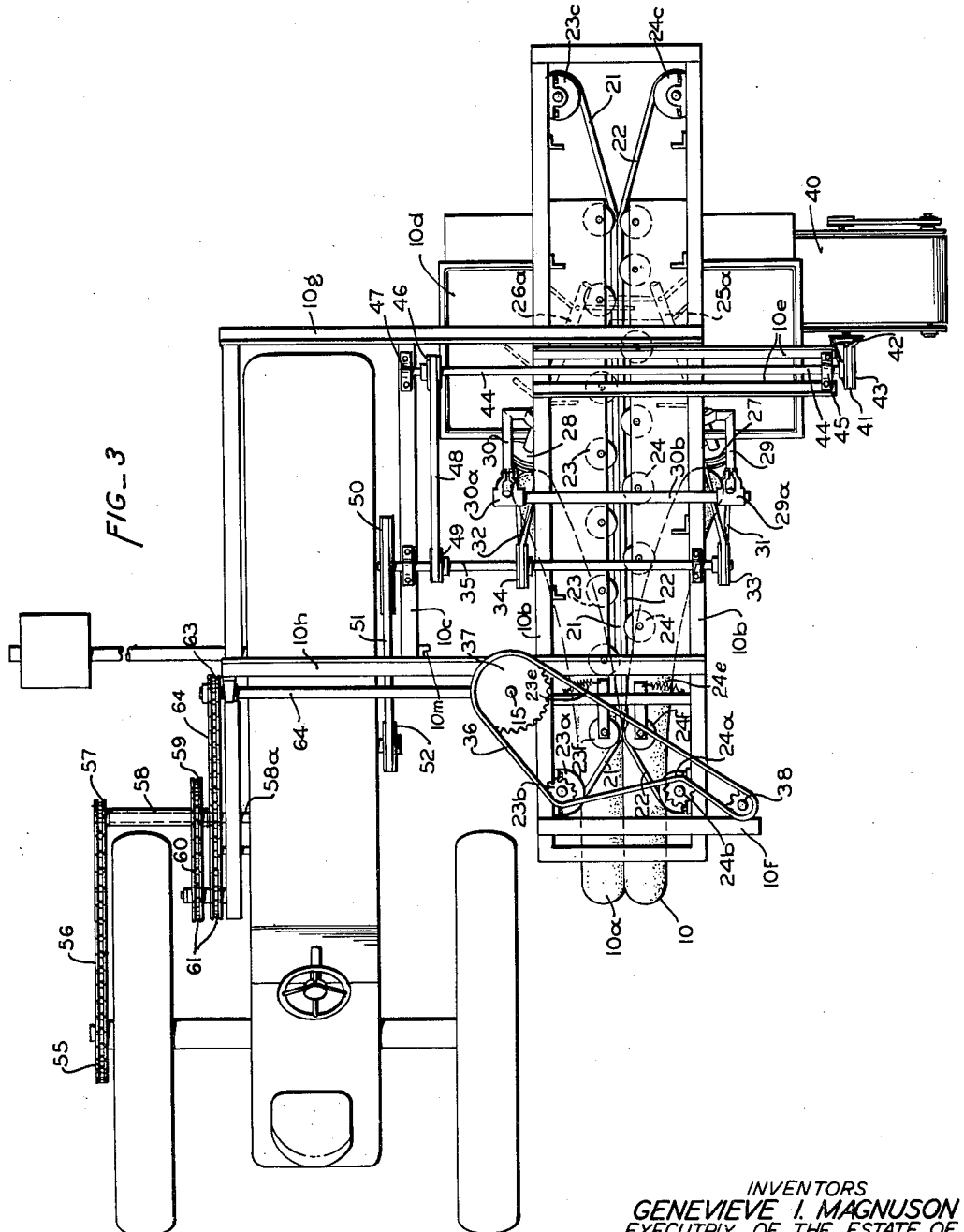

May 29, 1962 R. M. MAGNUSON ET AL 3,036,419
BEAN HARVESTER
Original Filed June 24, 1957 4 Sheets-Sheet 4
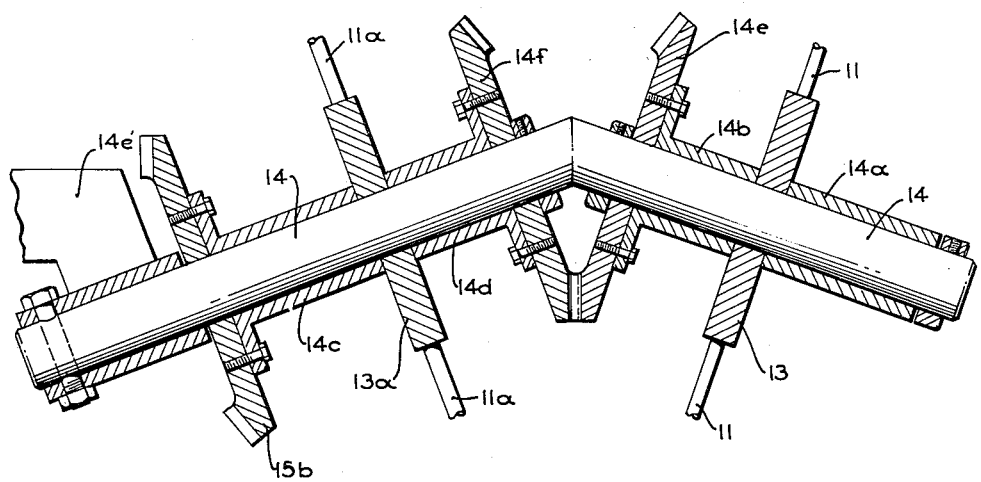
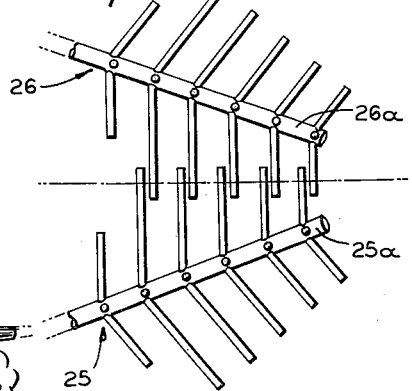
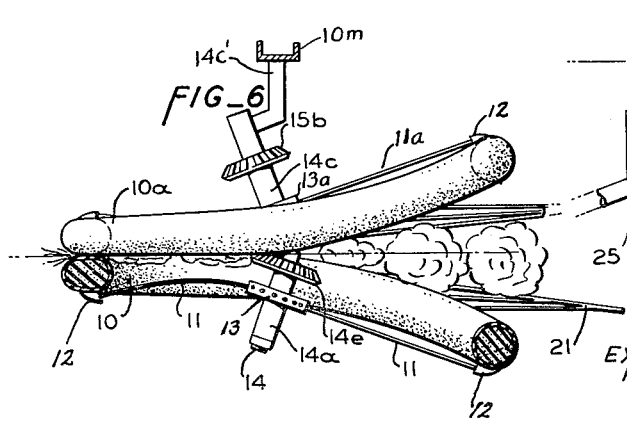
INVENTORS
GENEVIEVE I. MAGNUSON
EXECUTRIX OF THE ESTATE OF
ROY M. MAGNUSON, DECEASED
RALPH K. DAUGHERTY
BY
*Allen and Chromy*
their ATTORNEYS United States Patent Office 3,036,419
Patented May 29, 1962

3,036,419
BEAN HARVESTER
Roy M. Magnuson, deceased, late of Saratoga, Calif., by Genevieve I. Magnuson, executrix, Saratoga, Calif., and Ralph K. Daugherty, San Jose, Calif., assignors of one-half to Santa Clara Frosted Foods Co., one-fourth to Genevieve I. Magnuson, and one-fourth to Genevieve I. Magnuson, Robert M. Magnuson, and Lois J. Fox, as trustees
Substituted for abandoned application Ser. No. 667,657, June 24, 1957. This application June 13, 1960, Ser. No. 35,842
4 Claims. (Cl. 56—1)

This invention relates to an apparatus for harvesting vegetable crops.

This application is a substitute of our application S.N. 667,657, filed June 24, 1957, now abandoned.

This invention relates to an apparatus that may be employed to perform the method disclosed in application S.N. 559,367, filed January 16, 1956 by Roy M. Magnuson, Patent No. 2,940,528 issued June 14, 1960.

An object of this invention is to provide an improved apparatus for harvesting vegetable crops such as beans, peas and the like.

Another object of this invention is to provide an improved machine that removes vegetable plants, such as beans, peas and the like from the field, strips the pods therefrom and discards the plant stems while the machine is propelled through the field.

Still another object of this invention is to provide an improved machine with means for gripping the stems of vegetable plants such as beans, peas and the like, near the ground and while holding the plants inverted by the stems thereof, strips the pods therefrom, thereafter discarding said stems.

A further object of this invention is to provide an improved machine for harvesting vegetable crops, the machine employing a pair of yieldable, rotatable members that are adapted to be slightly deformed to come together and grip the stems of the vegetable plants therebetween to lift the plants away from the ground for further processing.

Other and further objects of this invention will be apparent to those skilled in the art to which it relates from the following specification, claims and drawing.

In accordance with this invention there is provided an improved machine for harvesting vegetable crops such as beans, peas and the like. This machine comprises a pair of yieldable and deformable wheels that are mounted so that a portion of the deformable annularly-shaped casings thereof are disposed in spaced relation and other portions of these casings are brought together into yieldable contact. As the machine is progressed over the vegetable row, the vegetables are severed from the roots thereof and gripped between these rotating annular casings. The gripped plants are moved upward by these rotating casings and inverted during the course of this rotation. The plants are then received by a conveyor that comprises a pair of belt members having the adjacent sides thereof moving side by side so that the inverted plants may be fed between these adjacent sides of the conveyor and carried forward into a rotatable stripper mechanism in which the vegetable pods are stripped from the stems and dumped upon another conveyor which feeds them to a suitable receptacle.

Other and further features of this invention will be set forth in the detailed specification and in the claims and drawing in which briefly:

FIG. 1 is a side view of an embodiment of this invention;

FIG. 2 is another side view of this invention showing the driving connection between it and a conventional tractor;

FIG. 3 is a plan view of this invention;

FIG. 4 is an enlarged sectional view taken along the line 4—4 of FIG. 1 showing the shaft for mounting the yieldable and deformable wheels;

FIG. 5 is an enlarged sectional view taken along the line 5—5 of FIG. 1, showing the vegetable pod strippers; and FIG. 6 is a plan view of the yieldable and deformable wheels showing one of the wheels in cross-section.

Referring to the drawing in detail there is shown in FIG. 1 an embodiment of this invention illustrating how this vegetable harvesting machine is adapted to be supported and operated by a conventional tractor. This invention employs a pair of yieldable, ring-shaped, rotatable wheel members 10 and 10a that comprise rubber outer casings filled with compressed air, shredded foam rubber or like filler to give them the proper yieldable body so that the wheel members are deformable as shown in FIG. 6 and cooperate to grip the vegetable plants therebetween. The outer casings 10 and 10a may be made of synthetic rubber and various plastic or like materials instead of rubber, and they are attached to the spokes 11 of spring steel or the like, through the use of patches 12 that are cemented, vulcanized or otherwise attached to the outer surface of the casings. The inner extremities of the spokes 11 are lodged in the hub 13 which is supported on the shaft 14.

The central hub portions of the wheel members 10 and 10a are shown in detail in the sectional view, FIG. 4. These hub portions include disk members 13 and 13a that are provided with holes around the outer portion thereof in which the spokes supporting the casings are lodged. Sleeves 14a and 14b are attached to the outer and inner sides of the disk member 13, respectively, and sleeves 14c and 14d are attached to the outer and inner sides of the disk member 13a, respectively, to form a more rugged bearing structure for the wheels which are of substantial diameter. These wheel hub portions are supported on the angle-shaped shaft 14 which is supported from the mechanism frame by means of the arm 14e'. The angle between the two sections of the shaft 14 is such that the rear portions of the casings of the wheel members 10 and 10a are brought together into intimate contact as shown in the plan view, FIG. 3 and FIG. 6, as will be more fully described hereinafter.

The wheel members 10 and 10a, including the casings, are driven by a shaft and gearing arrangement including the shaft 15 that is provided with a bevel gear 15a at the lower end thereof, adapted to mesh with a suitable beveled gear 15b that is attached to a flange on the outer end of the sleeve 14c. The inner ends of the sleeves 14b and 14d are provided with flanges to which the meshing bevel gears 14e and 14f, respectively, are attached, and these gears cooperate so that the wheels rotate in the same direction.

A knife 16 supported on a member 17 that is attached at the top thereof to the member 18, is employed for cutting the vegetable plants off just below the surface of the ground. For this purpose the knife 16 may be raised or lowered by the pivoted arms 19 and 20 as will be described hereinafter. These arms 19 and 20 are pivotally attached at the upper ends thereof to the tractor frame and at the lower ends thereof to the longitudinally extending knife-supporting member 18. Thus the knife 16 may be lowered into the ground by rotating the arms 19 and 20 on their upper pivots.

Extending to the front of the knife and also attached to the supporting member 18 are the guides 21a that function to guide the vegetable plants in an erect manner between the two rotatable wheel members 10 and 10a. The stems of the vegetable plants are received between these rotatable wheel members and gripped between the deformed portions of the wheel members as the plants are severed just below the surface of the ground by the knife 16. The wheel members 10 and 10a grip the severed plants therebetween, carry them upward, simultaneously inverting them before presenting them to the conveyors 21 and 22 that comprise a pair of V-shaped belts extending longitudinally of the machine. The adjacent sides of these belts are pressed toward each other by a plurality of pulleys 23 and 24 which are staggered on opposite sides of the belts 21 and 22.

The plant-receiving ends of the conveyor belts 21 and 22 describe a V-shaped opening formed so as to facilitate the feeding of the vegetable plant stems therebetween. This V-shaped opening is formed by the positioning of the driven end pulleys 23a and 24a on the spaced, longitudinal frame members 10b and the forward pair of pulleys 23f and 24f of the series of pulleys 23—24 are urged by the springs 23e and 24e toward each other so that the receiving ends of the conveyor belts converge to receive the plant stems. The pulleys 23a and 24a are attached to the sprocket wheels 23b and 24b, respectively, and these sprocket wheels are engaged by the chain 36 driven by the sprocket wheel 37 that is mounted on the shaft 15. A slack take-up pulley 38 is mounted on a shaft supported by the frame member 10f and the purpose of this pulley is to take up the slack from the chain 36 as desired.

The outer sides of the conveyor belts 21 and 22 pass underneath the frame members 10b and are directed to the pulleys 23c and 24c that are supported on suitable shafts journaled in bearings mounted on the forward end of the frame members 10b.

These conveyors 21 and 22 are adapted to receive the inverted plants therebetween and carry said plants in inverted position toward the strippers 25 and 26, each of which includes a plurality of extending fingers that are adapted to engage the inverted plant therebetween during the rotation thereof so that the inverted plants presented to the strippers are subjected to a sort of clawing action in which the vegetable pods are stripped from the stems. The shafts 25a and 26a of the strippers are journaled in suitable bearings supported at the lower ends of the rods 29 and 30, respectively, the upper ends of these rods being adjustably clamped to the end portions of the frame member 30b by means of the clamps 29a and 30a, respectively.

Pulleys 27 and 28 are mounted on the shafts 25a and 26a, respectively, and these pulleys are adapted to be driven by the V-belts 31 and 32 that are in turn driven by the pulleys 33 and 34, respectively, which are supported on the shaft 35 that is journaled in suitable bearings supported on the horizontal frame members 10b and 10c. The pods stripped from the vegetable plants drop into the hopper 10d that surrounds the strippers around the sides thereof, and this hopper guides the pods downward onto the conveyor 40 which is adapted to convey the pods to a suitable receptable (not shown). The conveyor 40 is driven by means of a V-belt 41 that engages a pulley 42 associated with said conveyor and is in turn driven by a pulley 43 that is supported on one end of the shaft 44 which is journaled in the bearings 45 and 47. The bearing 45 is supported on the frame members 10e and the bearing 47 is supported on the frame member 10c. A pulley 46 is provided near the other end of the shaft 44 and is engaged by the V-belt 48 which is driven from the pulley 49 that is supported on the shaft 35. This shaft 35 is driven by the V-belt 51 which engages the pulley 50 mounted on the shaft 35 and the belt 51 is in turn driven from the tractor pulley 52.

After the vegetable plants have passed through the strippers 25 and 26, the stems are moved forward by the conveyors 21 and 22 and ejected from the front end of this conveyor. These stems may be placed into a suitable receptacle or they may be discarded on the field as desired.

The apparatus is adapted to be driven from suitable power-delivering pulleys or sprockets provided to a tractor of conventional construction as shown in FIGS. 2 and 3. One of these pulleys 52, shown in FIG. 3, is employed for driving the shaft 35 through the use of a pulley 50 that is connected to the pulley 52 by the belt 51 as previously described. The shaft 15 is driven from a sprocket 55 that is fixedly attached to the main axle of the tractor, and for this purpose there is provided a drive chain 56, sprocket 57, hollow shaft 58, sprocket 59, chain 60, dual sprockets 61, chain 62, sprocket 63, shaft 64 and bevel gears 67 and 68, which elements engage each other in the order named. Beveled gear 68 is fixedly attached to the shaft 15, the lower end of which is provided with a beveled gear 15a which meshes with the gear 15b. The sprocket 57, hollow shaft 58 and sprocket 59 are made so as to be rotatable together and the unit comprising these three elements is supported on a rod 58a, that is supported on the tractor frame, so as to be rotatable with respect to this rod.

The dual sprocket 61 is pivotally supported on a pivot that is attached to the arm 62a of a bell crank which is also pivotally supported on the rod 58a. This bell crank includes another arm 62b which is integral with the arm 62a and which is pivotally attached to the piston rod 63b that is associated with the hydraulic cylinder 63a. This cylinder is attached to the tractor frame and is arranged to operate the bell crank through the piston rod 63b and raise and lower the mechanism including the yieldable wheel members 10 and 10a and their casings, the knife 16 and the plant guides 21a. This mechanism is supported on the tractor by means of a framework that straddles the top of the tractor and includes the horizontal members 10g and 10h which are connected to the upright frame members 10i and 10j, respectively, which latter members are connected near the bottom ends thereof to the lower member 18a, as shown in FIG. 2. Similar members 10l and 10m are provided on the other side of the tractor, as shown in FIG. 1, and these members are connected to the frame member 18.

The frame member 18 is pivotally supported from the tractor frame by means of the arms 19 and 20 as previously described, and the member 18a shown in FIG. 2 is pivotally supported from the tractor frame by means of the arm 20a and the arm 62a of the bell crank. The members 18 and 18a, furthermore, are connected together by means of the cross piece 18b.

It will now be apparent that this mechanism is pivotally supported from the bottom of the tractor frame by means of the arms 19, 20, 20a and the bell crank arm 62a, and that therefore this mechanism may be raised or lowered with respect to the tractor by means of the hydraulic cylinder 63a and the piston rod 63b that is connected to the bell crank arm 62b. Thus when this mechanism is being moved from one field to another, the knife 16 is raised well above the ground, and when the mechanism is employed for harvesting the vegetable crop, knife 16 is lowered into the ground and the casings of the wheel members 10—10a are lowered to be just above the surface of the ground so as to be in a position to receive the vegetable plants therebetween as said plants are severed from the roots thereof by the knife 16. The knife 16 also may be given a depth adjustment with respect to the frame member 18 to which its support 17 is attached by means of suitable bolts.

While we have shown a preferred embodiment of the invention, it will be understood that the invention is capable of variation and modification from the form shown so that its scope should be limited only by the scope of the claims appended hereto.

What we claim is:

1. A machine for harvesting vegetable crops such as beans, peas and the like, comprising opposed ring-shaped casings of yieldable material, a plurality of resilient spokes for supporting each of said opposed casings, said resilient spokes permitting said casings to be deformed so that substantially the rear half portions thereof are pressed into resilient engagement with each other, a pair of hubs to which said resilient spokes are attached, said hubs being disposed at an angle with respect to each other, means for rotating said hubs and said casings so that different portions of said annular casings are brought into intimate contact during said rotation thereof to grip the vegetable bearing portions of plants therebetween, said annular casings being adapted to lift the plants gripped therebetween away from the ground and simultaneously invert said plants during rotation thereof, conveyor means positioned to receive the inverted plants from said casings and for suspending said inverted plants, and means for stripping the vegetable crop from said plants while they are moved inverted and suspended by said conveyor means.

2. A machine for harvesting vegetable crops such as beans, peas and the like, comprising opposed ring-shaped casings of yieldable material, a plurality of resilient spokes for supporting each of said opposed casings, said resilient spokes permitting said casings to be deformed so that substantially the rear half portions thereof are pressed into resilient engagement with each other, the bottom front portions of said opposed casings form a V-shaped opening therebetween, means for rotating said casings so that different portions thereof are brought into intimate contact during the rotation thereof to grip vegetable bearing portions of plants therebetween, said annular casings being adapted to lift the plants gripped therebetween away from the ground and simultaneously invert said plants during rotation thereof, conveyor means positioned over said casings to receive and grip the inverted plants above the vegetable bearing part of the plants, and means for stripping the vegetable crop from said plants while they are moved inverted and suspended by said conveyor means.

3. A machine for harvesting vegetable crops such as beans, peas and the like in which the plant is severed from its roots and then is gripped, elevated and simultaneously inverted, the combination comprising opposed ring-shaped casings of yieldable material, rotatable means for rotatably supporting said opposed casings so that substantially the rear half portions thereof are pressed into resilient engagement with each other, and both the bottom portions and the top portions of the remaining front portions of said opposed casings form V-shaped openings therebetween so that the plants to be gripped are adapted to enter the V-shaped opening between the bottom portions to be gripped between the rear half portions, said rotatable supporting means comprising resilient spokes attached to said casings, said supporting means also having hubs disposed at an angle with respect to each other, said resilient spokes being adapted to be flexed during the rotation of said casings so that substantially the rear half portions of said casings are brought into intimate contact during said rotation and grip vegetable plants therebetween thereby lifting said plants away from the ground and simultaneously inverting said plants during rotation of said casings, conveyor means positioned to receive the inverted plants as they are discharged from the upper V-shaped opening between said casings, said conveyor means having means for gripping said plants for carrying said plants inverted and suspended therefrom away from said casings and means for stripping the vegetable crop from said plants while they are moved inverted and suspended by said conveyor means.

4. A machine for harvesting vegetable crops such as beans, peas and the like in which the plant is severed from its roots and then is gripped, elevated and simultaneously inverted, the combination comprising opposed ring-shaped casings of yieldable material, rotatable means for rotatably supporting said opposed casings so that substantially the rear half portions thereof are pressed into resilient engagement with each other, and both the bottom portions and the top portions of the remaining front portions of said opposed casings form V-shaped openings therebetween so that the plants to be gripped are adapted to enter the V-shaped opening between the bottom portions to be gripped between the rear half portions, said rotatable means comprising two sets of resilient spokes and means for attaching the outer ends of one set of said resilient spokes to the outer side of one of said casings and means for attaching the outer ends of the other set of said resilient spokes to the outer side of the other of said casings, said supporting means also having hubs disposed at an angle with respect to each other, said resilient spokes being adapted to be flexed during the rotation of said casings so that substantially the rear half portions of said casings are brought into intimate contact during said rotation and grip vegetable plants therebetween thereby lifting said plants away from the ground and simultaneously inverting said plants during rotation of said casings, conveyor means positioned to receive the inverted plants as they are discharged from the upper V-shaped opening between said casings, said conveyor means having means for gripping said plants for carrying said plants inverted and suspended therefrom away from said casings and means for stripping the vegetable crop from said plants while they are moved inverted and suspended by said conveyor means.

References Cited in the file of this patent
UNITED STATES PATENTS

| | | |
|---|---|---|
| 798,305 | Smith | Aug. 29, 1905 |
| 2,648,185 | Dahlman | Aug. 11, 1953 |
| 2,679,716 | Dunkle | June 1, 1954 |